(12) United States Patent
Shi et al.

(10) Patent No.: US 8,363,595 B2
(45) Date of Patent: Jan. 29, 2013

(54) METHODS AND SYSTEMS USING EFFICIENT TRANSMISSION OF DCD/UCD MESSAGES IN A WIMAX SYSTEM

(75) Inventors: Guangming Carl Shi, San Diego, CA (US); Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 12/425,509

(22) Filed: Apr. 17, 2009

(65) Prior Publication Data

US 2010/0265881 A1    Oct. 21, 2010

(51) Int. Cl.
H04W 4/00    (2009.01)
(52) U.S. Cl. ........................................... 370/328
(58) Field of Classification Search .................. 370/328
See application file for complete search history.

(56) References Cited

U.S. PATENT DOCUMENTS

| 2006/0029011 A1 | 2/2006 | Etemad et al. | |
| 2009/0197601 A1* | 8/2009 | Kim et al. ................ | 455/434 |

FOREIGN PATENT DOCUMENTS

| EP | 1655983 | 5/2006 |
| WO | WO2006071096 | 7/2006 |

OTHER PUBLICATIONS

NPL document IEEE Std 802.16e-2005, Part 16: Air Interface for Fixed and Mobile Broadband Wireless Access Systems, dated Feb. 2006.*
Chen, Tuan-Che et al.: "Maximizing Unavailability Interval for Energy Saving in IEEE 802.16e Wireless. MANs," IEEE Transactions on Mobile Computing, IEEE Service Center, Los Alamitos, CA, USA, vol . 8, No. 4, (Apr. 1, 2009), pp. 475-487, XP011248096, ISSN: 1536-1233.
IEEE Computer Society and the IEEE Microwave Theory and Technique Society: "IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1"; IEEE Std 802.16e-2005 and IEEE Std 802.16-2004/Cor1-2005, IEEE Standard; New York: (Feb. 26, 2006), XP017601713, ISBN: 9780738148564, paragraph [6.3.2.3]—paragraph [6.3.2.3.1], paragraph [6.3.2.3.43.4], paragraph [6.3.2.3.47], paragraph [6.3.17]—paragraph [6.3.17.1], paragraph [8.4.5.3], paragraph [8.4.2.3.21].
International Search Report and Written Opinion—PCT/US2010/031399, International Search Authority—European Patent Office—Jun. 28, 2010.

* cited by examiner

Primary Examiner — Derrick Ferris
Assistant Examiner — Majid Esmaeilian
(74) Attorney, Agent, or Firm — Tyler J. Overall

(57) ABSTRACT

Embodiments of the present disclosure propose a method and apparatus for ensuring each mobile station serviced by a base station does not miss a new version of a DCD/UCD message before the new version takes effect.

16 Claims, 12 Drawing Sheets

| MS Index | Frame Number Index | | | | | | | | | |
|---|---|---|---|---|---|---|---|---|---|---|
| | 1 | 2 | 3 | 4 | 5 | 6 | 7 | 8 | 9 | 10 |
| 1 | 0 | 0 | 1 | 1 | 0 | 0 | 1 | 1 | 0 | 0 |
| 2 | 1 | 1 | 1 | 0 | 0 | 0 | 1 | 1 | 1 | 0 |
| 3 | 1 | 1 | 1 | 1 | 0 | 0 | 1 | 1 | 1 | 1 |
| 4 | 1 | 0 | 0 | 0 | 0 | 1 | 1 | 0 | 0 | 0 |
| 5 | 0 | 0 | 0 | 1 | 1 | 1 | 1 | 0 | 0 | 0 |
| g(*) | 3 | 2 | 3 | 3 | 1 | 2 | 5 | 3 | 2 | 1 | g(*) = A number representing the number of MSs which may receive a new DCD/UCD message

FIG. 8

| MS Index | Frame Number Index | | | | | | | | | |
|---|---|---|---|---|---|---|---|---|---|---|
| | 1 | 2 | 3 | 4 | 5 | 6 | 7 | 8 | 9 | 10 |
| 1 | 0 | 0 | 1 | 1 | 0 | 0 | 1 | 1 | 0 | 0 |
| 2 | 0 | 1 | 1 | 0 | 0 | 0 | 0 | 1 | 1 | 0 |
| 3 | 1 | 1 | 1 | 1 | 0 | 0 | 1 | 1 | 1 | 1 |
| 4 | 1 | 0 | 0 | 0 | 0 | 1 | 1 | 0 | 0 | 0 |
| 5 | 0 | 0 | 0 | 1 | 1 | 1 | 0 | 0 | 0 | 0 |
| g(*) | 2 | 2 | 3 | 3 | 1 | 2 | 3 | 3 | 2 | 1 |

FIG. 9A

| MS Index | Frame Number Index | | | | | | | | | |
|---|---|---|---|---|---|---|---|---|---|---|
| | 1 | 2 | 3 | 4 | 5 | 6 | 7 | 8 | 9 | 10 |
| 4 | 1 | 0 | 0 | 0 | 0 | 1 | 1 | 0 | 0 | 0 |
| 5 | 0 | 0 | 0 | 1 | 1 | 1 | 0 | 0 | 0 | 0 |
| g(*) | 0 | 0 | 0 | 1 | 1 | 2 | 1 | 0 | 0 | 0 |

FIG. 9B

METHODS AND SYSTEMS USING EFFICIENT TRANSMISSION OF DCD/UCD MESSAGES IN A WIMAX SYSTEM

TECHNICAL FIELD

Certain embodiments of the present disclosure generally relate to wireless communication and, more particularly, to the transmission of version changes in downlink channel descriptor (DCD) messages and uplink channel descriptor (UCD) messages.

SUMMARY

Certain embodiments of the present disclosure provide a method of wireless communications. The method generally includes determining a first set of mobile stations (MSs) that may be in an unavailable state in a sleep mode or a scanning mode, determining a set of frames in which to send a new channel descriptor (CD) message, comprising at least one of a downlink channel descriptor (DCD) message and an uplink channel descriptor (UCD) message, such that the new CD message is received by each MS in the first set of MSs prior to the CD message taking effect, and transmitting the new CD message during each frame in the set of frames.

Certain embodiments of the present disclosure provide an apparatus for wireless communications. The apparatus generally includes logic for determining a first set of mobile stations (MSs) that may be in an unavailable state in a sleep mode or a scanning mode, logic for determining a set of frames in which to send a new channel descriptor (CD) message, comprising at least one of a downlink channel descriptor (DCD) message and an uplink channel descriptor (UCD) message, such that the new CD message is received by each MS in the first set of MSs prior to the CD message taking effect, and logic for transmitting the new CD message during each frame in the set of frames.

Certain embodiments of the present disclosure provide an apparatus for wireless communications. The apparatus generally includes means for determining a first set of mobile stations (MSs) that may be in an unavailable state in a sleep mode or a scanning mode, means for determining a set of frames in which to send a new channel descriptor (CD) message, comprising at least one of a downlink channel descriptor (DCD) message and an uplink channel descriptor (UCD) message, such that the new CD message is received by each MS in the first set of MSs prior to the CD message taking effect, and means for transmitting the new CD message during each frame in the set of frames.

Certain embodiments of the present disclosure provide a computer-program product for wireless communications, comprising a computer readable medium having instructions stored thereon, the instructions being executable by one or more processors. The instructions generally include instructions for determining a first set of mobile stations (MSs) that may be in an unavailable state in a sleep mode or a scanning mode, instructions for determining a set of frames in which to send a new channel descriptor (CD) message, comprising at least one of a downlink channel descriptor (DCD) message and an uplink channel descriptor (UCD) message, such that the new CD message is received by each MS in the first set of MSs prior to the CD message taking effect, and instructions for transmitting the new CD message during each frame in the set of frames.

In certain embodiments, as disclosed herein, including the summary paragraphs presented above, the new CD message can be transmitted in accordance with one or more standards of the Institute of Electrical and Electronics Engineers (IEEE) 802.16 family of standards.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 8 illustrates an example selection matrix, which may be used by a BS in selecting a set of frames in which to send a new DCD/UCD message.

FIGS. 9A and 9B illustrate the changes to an example selection matrix over two iterations of the example operations.

DETAILED DESCRIPTION

Figure 1:
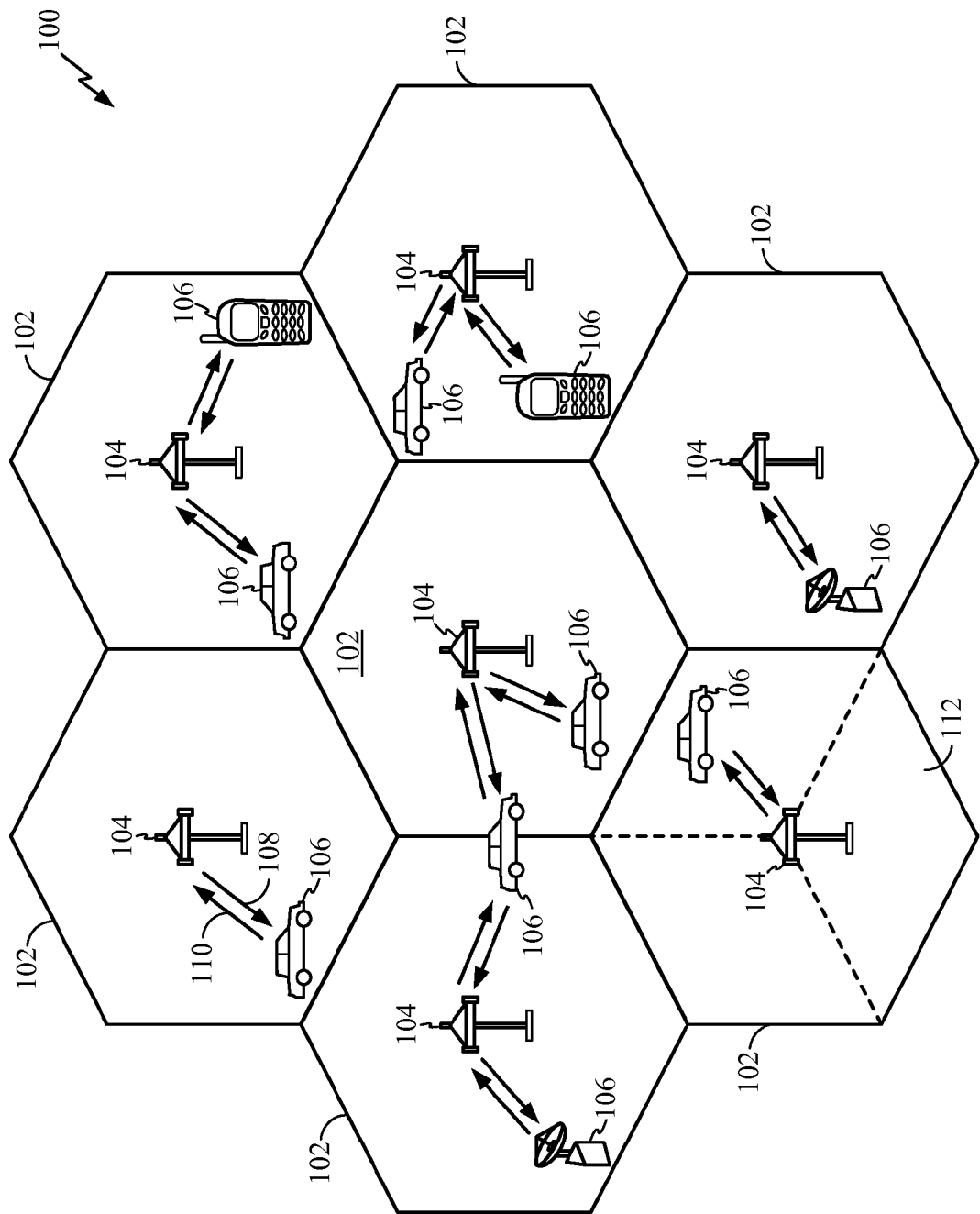
FIG. 1 illustrates an example wireless communication system, in accordance with certain embodiments of the present disclosure.

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station emits and receives radio frequency (RF) signals that convey data to and from the mobile stations.

Under the current versions of the IEEE 802.16x standard for OFDMA systems, each base station (BS) periodically broadcasts a Downlink Channel Descriptor (DCD) and an Uplink Channel Descriptor (UCD) message to each mobile station (MS) serviced by the BS. However, the DCD and UCD messages may occasionally change. To ensure that the MSs are informed of a DCD/UCD change prior to the change taking effect, the 802.16 standard requires the BS to broadcast a new version of the DCD/UCD prior to the new DCD/UCD taking effect.

However, when the BS broadcasts the new version of the DCD/UCD message, some MSs may be in a low power state (e.g., a sleep mode or scanning mode) and may miss the new DCD/UCD message. If an MS does not receive the new DCD/UCD message before the new version becomes effective, the MS may suspend all operations (i.e., service may be disrupted) until a new DCD/UCD version is acquired.

Embodiments of the present disclosure propose a method and apparatus for limiting the number of MSs serviced by the BS that do not receive a new version of a DCD/UCD message before the new version takes effect. For example, embodiments may determine a set of frames during which each MS is awake or available and send the new version of the MS during one or more of the frames of the set of frames.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
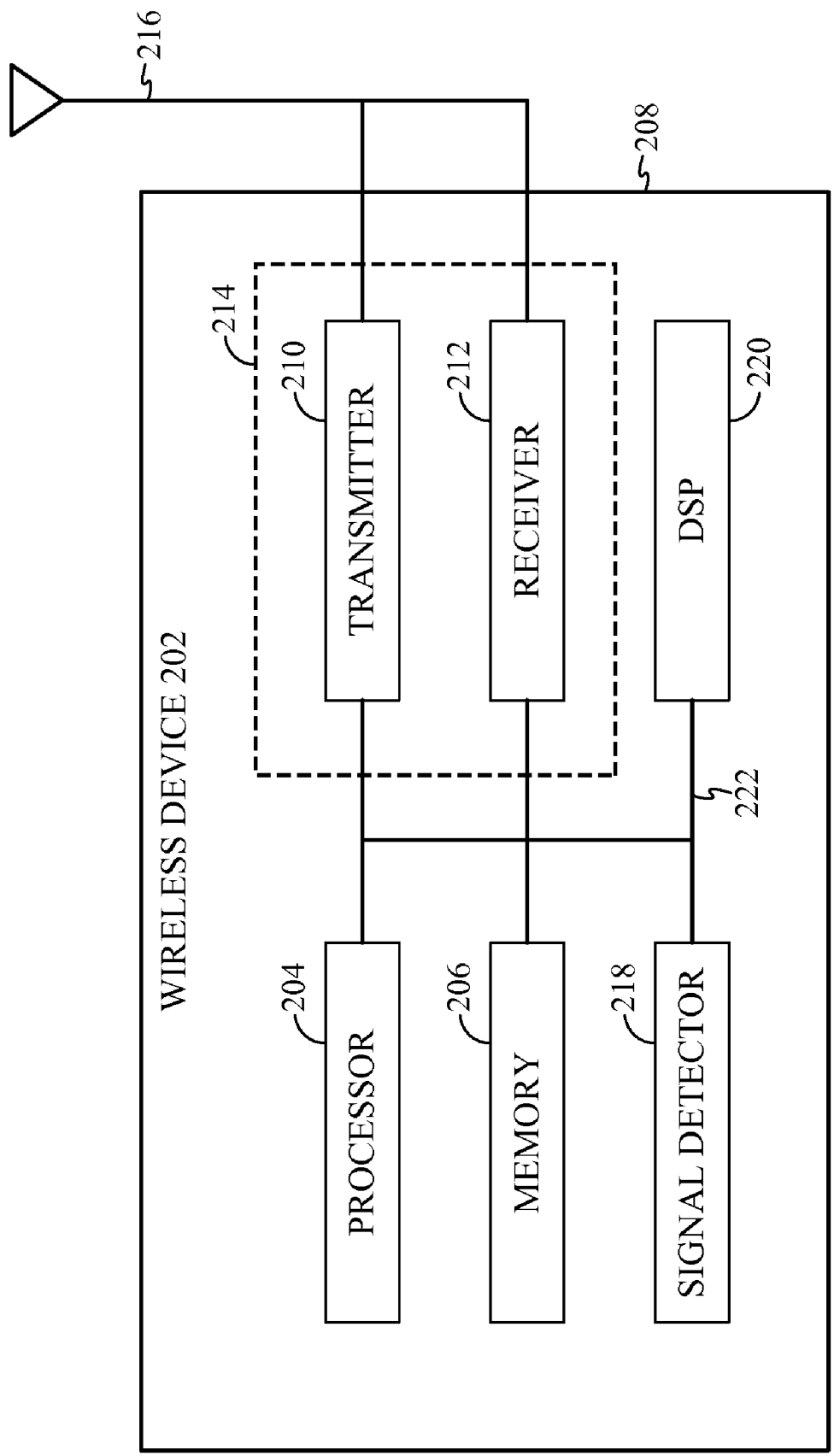
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). Processor 204 typically performs logical and arithmetic operations based on program instructions stored within memory 206. The instructions in memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
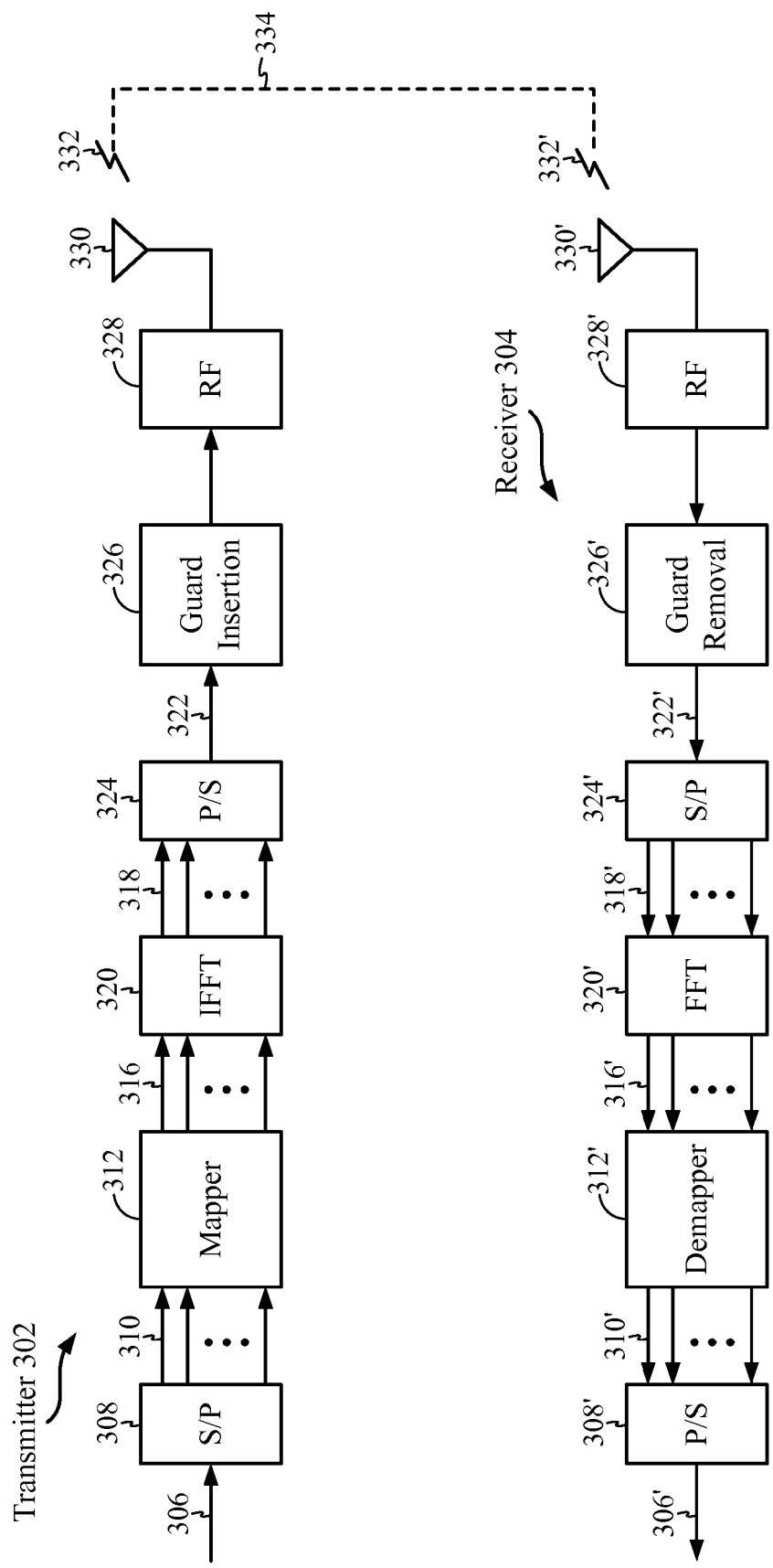
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. Transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Transmission of a New Version of a DCD/UCD Message

Under current versions of the IEEE 802.16x standard for the OFDMA systems, each BS periodically broadcasts a Downlink Channel Descriptor (DCD) and an Uplink Channel Descriptor (UCD) message defining the characteristics of a physical downlink or uplink channel, respectively. However, the DCD/UCD messages may occasionally change. Consequently, the BS may need to inform the MSs serviced by the BS of a DCD/UCD change.

Figure 4:
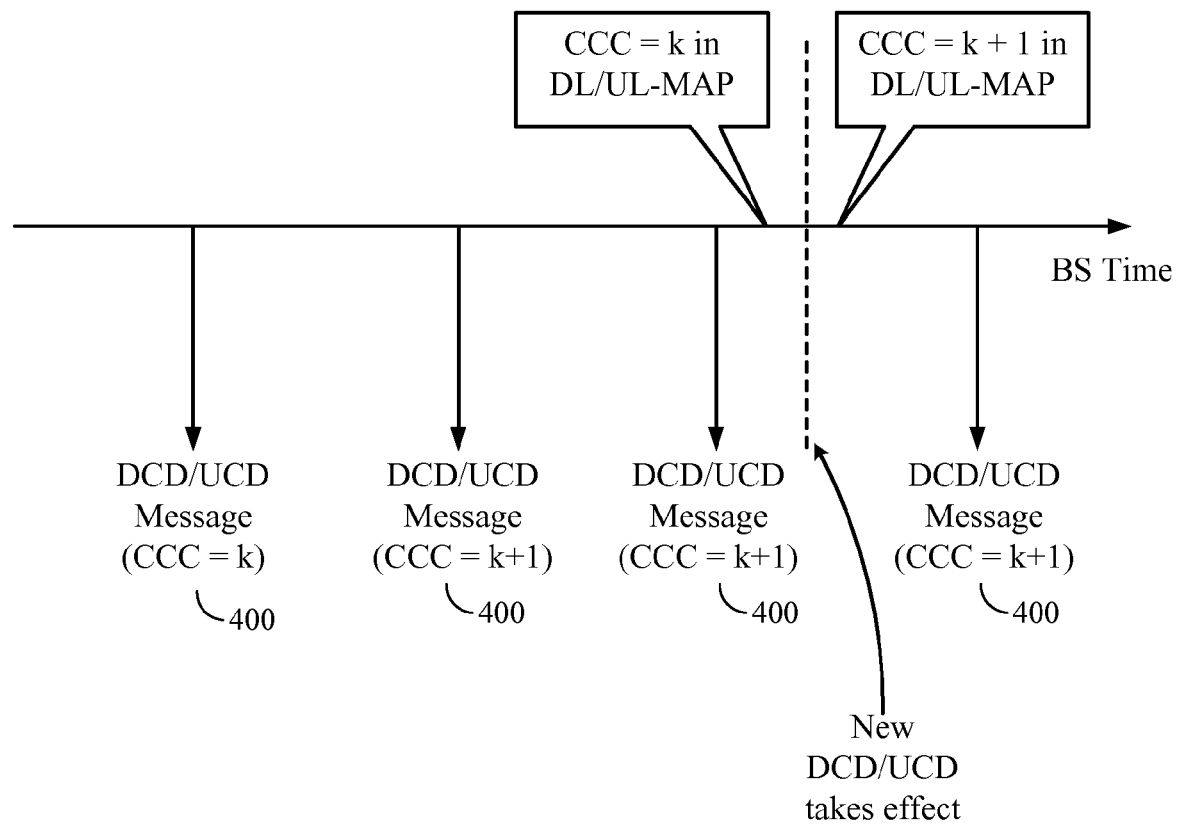
FIG. 4 illustrates an example-timing diagram of a DCD or UCD message sent by a BS.

To ensure that the MSs are informed of a DCD/UCD change prior to the change taking effect, the 802.16 standard requires the BS to broadcast the new version of the DCD/UCD prior to the new version taking effect. FIG. 4 illustrates a new version of a DCD/UCD (CCC=k+1) message 400 being transmitted prior to the new version taking effect. The version of a DCD/UCD message may be indicated by tagging DCD/UCD messages with a Configuration Change Count (CCC) corresponding to a version of the DCD or UCD. For example, the current version of the DCD/UCD may be represented by a CCC equal to a number k, but when the DCD/UCD version changes, the CCC is incremented to a number k+1. The CCC corresponding to the current version of the DCD may be communicated to the MS in a Downlink (DL)-MAP found in each frame, while the CCC corresponding to the current version of the UCD may be indicated in an Uplink (UL)-MAP.

However, there may be instances in which one or more MSs serviced by the BS are in an unavailable state of the sleep mode or scanning mode when the new version of the DCD/UCD (CCC=k+1) message 400 is sent. Consequently, the MS may miss the new version of the DCD/UCD message 400, delaying MS operations dependant thereon.

Figure 5:
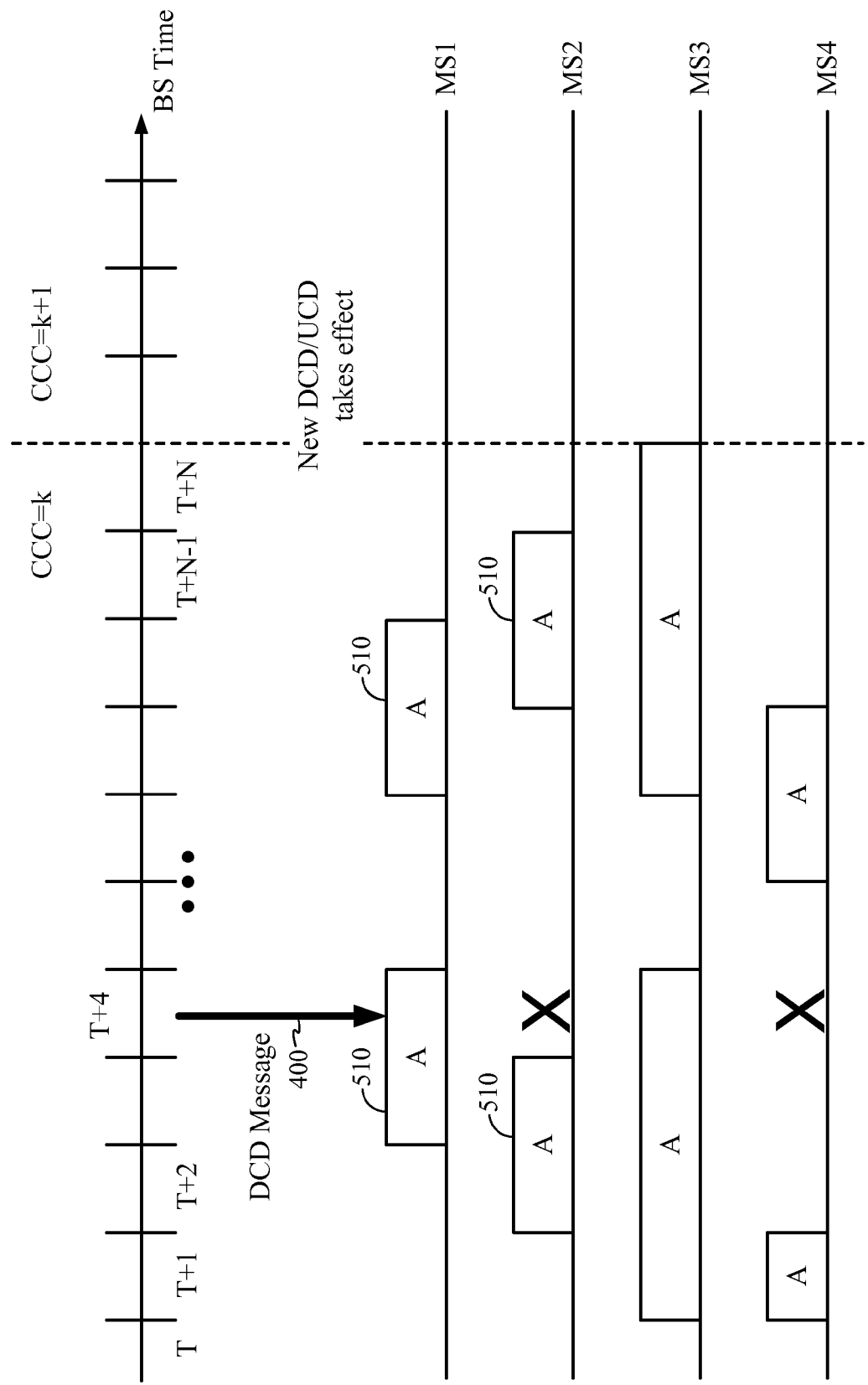
FIG. 5 illustrates a DCD message being sent to a plurality of MSs in various power saving modes.

FIG. 5 illustrates a DCD message being sent to a plurality of MSs MS1-4 in various power saving modes. After determining that a new DCD/UCD message is going to take effect, the BS may determine that the new DCD/UCD message needs to be sent within the subsequent N frames from the present frame T. However, when the BS broadcasts the new version of the DCD/UCD message, some MSs may be unavailable and may miss the new DCD/UCD message. For example, one or more MSs may be in a sleep interval in the sleep mode (i.e. power saving periodically) or in a scanning interval of the scanning mode (i.e. for scanning the neighbor BS for a few iterations), as illustrated with MS2 and MS4. If the MSs do not receive the new DCD/UCD message before the new version becomes effective, the MSs may suspend all operations (i.e., service may be disrupted) until a new DCD/UCD version is acquired.

Accordingly, embodiments of the present disclosure propose a method and apparatus for ensuring each MS serviced by the BS does not miss a new version of a DCD/UCD message before the new version takes effect. For example, embodiments may determine a set of frames during which each MS is awake or available and send the new version of the MS during one or more of the frames of the set of frames.

One set of frames selected to ensure that each MS receives a new version of a DCD/UCD message before the new version takes effect might include each frame between the present frame T and the future frame T+N. However, such a set of frames may waste a significant portion of the available bandwidth.

In an effort to conserve bandwidth, certain embodiments may select the members of the set of frames such that the number of DCD/UCD messages transmitted over the time interval T to T+N is limited while still ensuring that each MS can receive the new version of the DCD/UCD message at least once.

Figure 6:
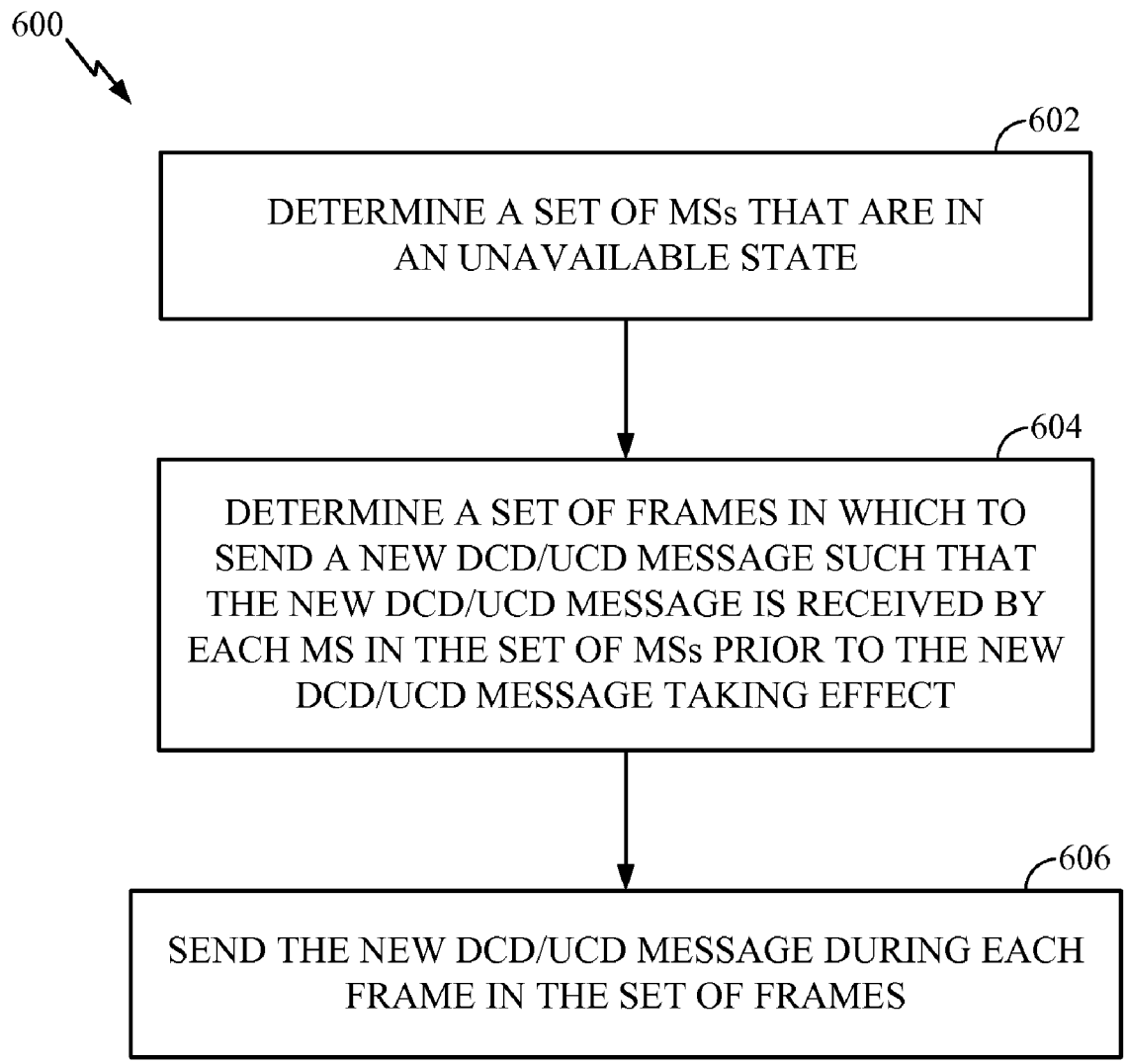
FIG. 6 illustrates example operations for sending a new DCD/UCD message such that each MS in a set of MSs receive the new message.

FIG. 6 illustrates example operations 600 for transmitting a new version of a DCD/UCD message during a select set of frames prior to the new version taking effect. The operations 600 may be performed, for example, by a BS in an effort to ensure each MS serviced by the BS does not miss the new version of the DCD/UCD message.

Operations 600 begin, at 602, with a BS determining a set of MSs that can be in an unavailable state of sleep mode or scanning mode. Since each MS negotiates the parameters defining an unavailable state with the BS prior to entering the sleep mode or scanning mode, the BS may know that there are M MSs with indices i=1, 2, ..., M, in an unavailable state during the subsequent N frames.

At 604, the BS may determine a set of frames in which to send a new DCD/UCD message such that the new DCD/UCD message is received by each MS in the set of MSs. In certain embodiments, the selection of the set of frames may be based on an availability schedule for each MS in the set of MSs. In certain embodiments, the availability schedule a(i,j) for each MS in the set of MSs may be configured such that a(i,j)=1 corresponds to an MS i being available during frame T+j and a(i,j)=0 corresponds to an MS i being unavailable during frame T+j.

At 606, the BS may send the new version of the DCD/UCD message during each frame in the set of frames.

For some embodiments, the BS may attempt to minimize the number of frames in which the new version of the DCD/UCD message is transmitted. This idea may be explained with reference to Equation 1:

$$\min \Sigma_{j=1}^{N} x(j), \quad (1)$$

where x(j)=1 when the BS transmits the new version of the DCD/UCD message during frame T+j and x(j)=0 when the BS does not transmit the new version of the DCD/UCD message during frame T+j for frame index j=1, 2, ..., N.

In an effort to ensure that each MS receives the new version of the DCD/UCD message during a period of time in which the MS is available, the BS may utilize Equation 2:

$$\Sigma_{j=1}^{N} a(i,j) \cdot x(j) \geq 1, \text{ for } i=1,2,\ldots,M. \quad (2)$$

However, in order to enable the feasibility of the constraint in equation (2), the length of time interval N may need to be long enough so that each MS can have at least one frame of availability. If an MS does not have at least one frame of availability during the time interval T to T+N, this MS should be excluded from the set of MSs that are in an unavailable state because it is impossible to satisfy this MS.

However, it is often computationally prohibitive to find the optimal set of frames in which to send the new version of the DCD/UCD message (where the optimal set of frames may be interpreted to be the smallest set of frames that ensure that the new version of the DCD/UCD message is received by each MS in the set of MSs prior to the new version taking effect).

For example, a BS may service 100 MSs in an unavailable state where each MS had an independent availability schedule. Accordingly, certain embodiments may use a heuristic algorithm to find a useful set of frame that might be slightly less than optimal.

Figure 7:
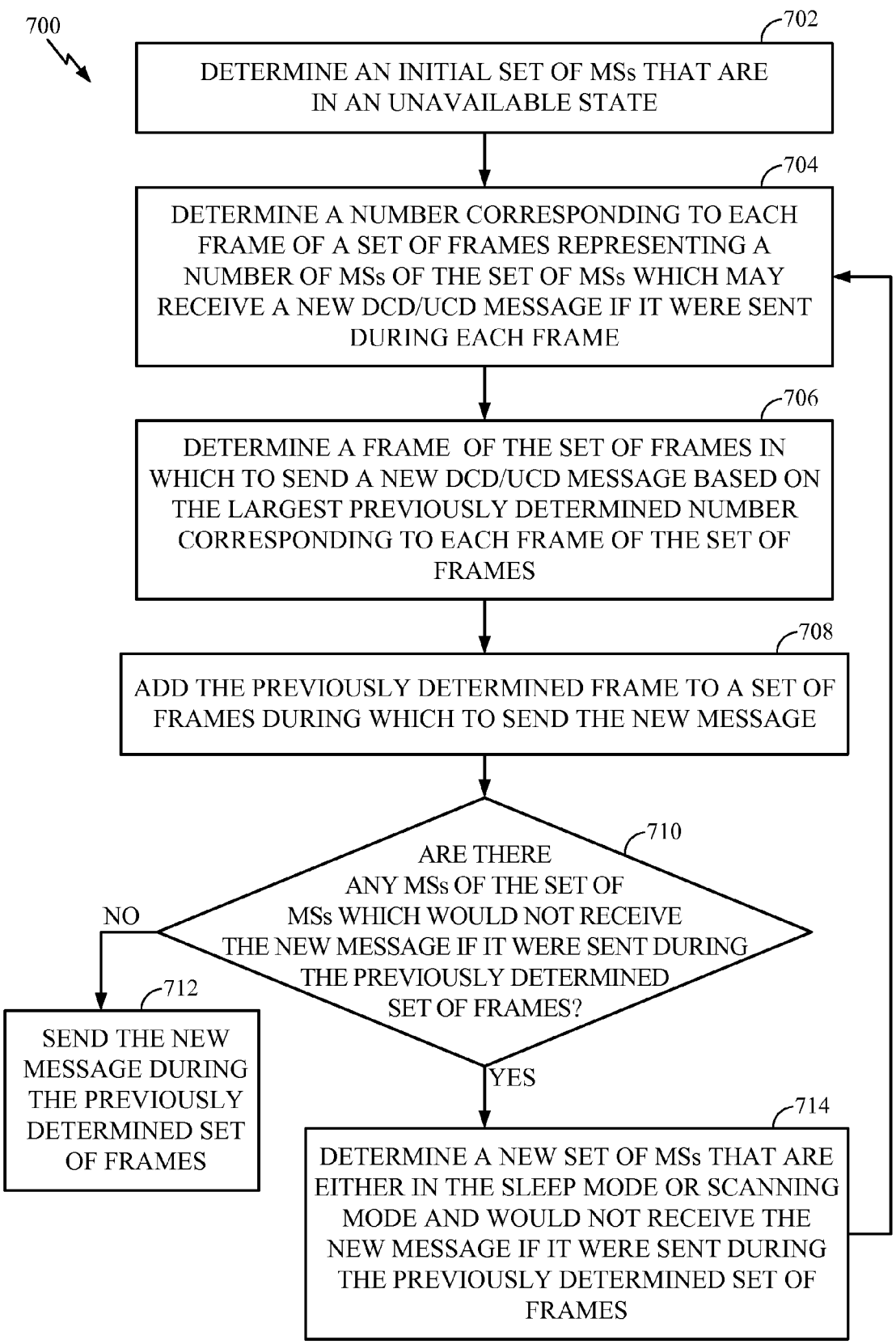
FIG. 7 illustrates example operations for selecting a set of frames in which to send a new DCD/UCD message such that each MS in a set of MSs receives the new message.

FIG. 7 illustrates example operations 700 for selecting a set of frames in which to send a new DCD/UCD message such that each MS in a set of MSs receive the new message. The operations 700 may be performed, for example, by a BS in an effort to reduce the number of frames in which the new version of the DCD/UCD message is sent while ensuring each MS serviced by the BS does not miss the new version.

Operations 700 begin, at 702, with the BS determining a set of MSs A that can be in an unavailable state. As before, the BS may know that there are M MSs with indices i=1, 2, ..., M, in an unavailable state during the subsequent N frames because each MS negotiates the parameters defining an unavailable state with the BS prior to entering the sleep mode or the scanning mode.

At this point, the BS may also initialize a subset of frames S to be a null set. The significance of the subset of frames S is described below.

At 704, the BS may determine a number g corresponding to each frame {T+1, T+2, ..., T+N} of a set of frames T+j, the number g(j) representing the number of MSs that may receive the new DCD/UCD message if it were sent during that particular frame. In certain embodiments, g(j) may be described by Equation 3:

$$g(j)=\Sigma_{i \in A} a(i,j) \text{ for } j=1,2,\ldots,N. \quad (3)$$

At 706, the BS may compare the previously determined numbers g(j) and select a frame f of the set of frames in which to send a new DCD/UCD message. In certain embodiments, the BS may select the frame f of the set of frames by determining which frame would enable the new DCD/UCD message to reach the most MSs.

For example, FIG. 8 illustrates an example selection matrix in which there is a set A of M mobile stations with indices i ∈ A={1, 2, ..., 5} and a set of frames with frame number indices j ∈ {1, 2, ..., 10}, during which the new DCD/UCD message may be sent. By comparing the number g corresponding to each frame j, the BS may determine that each of the five MSs may be reached by sending the new DCD/UCD message during frame 7.

In some situations, there may be two or more frames enabling the same number of MSs to be reached. Accordingly, certain embodiments may allow the BS to randomly select one of the two or more frames.

However, there may be situations in which no single frame would enable each MS of the set A of MSs to receive the new DCD/UCD message. Accordingly, the BS may maintain the subset of frames S during which the new DCD/UCD message may be sent. At 708, the BS may add the previously selected frame f of the set of frames to the subset of frames S.

At 710, the BS may determine if there are any MSs of the set of MSs A which would not receive the new DCD/UCD message if it were sent during each frame of the subset of frames S. This may be done by identifying a new set of MSs B, where each MS of the set B are able to receive the new DCD/UCD message if it were sent during each frame of the subset of frames S. Mathematically, the set of MSs B may be described by Equation 4:

$$B=\{i: a(i,f)=1\} \text{ where } i \in A. \quad (4)$$

The BS may then redefine the set of MSs A such that A=A−B and determine if A is a null set.

If the set of MSs A is a null set after being redefined, the BS, at 712, may send the new DCD/UCD message during each frame of the subset of frames S. However, if the set of MSs A is not a null set (i.e., there is at least one MS of the original set of MSs which would not receive the new message), the BS may take the redefined set of MSs A and repeat operations 704-710 until the set of MSs A becomes a null set.

FIGS. 9A and 9B illustrate an example selection matrix in which there is a set A of M mobile stations with indices $i \in A=\{1, 2, \ldots, 5\}$ and a set of frames with frame number indices $j \in \{1, 2, \ldots, 10\}$, during which the new DCD/UCD message may be sent. However, in this situation there is no single frame which would enable each MS of the set A of MSs to receive the new DCD/UCD message.

By comparing the number g corresponding to each frame j, the BS may determine that three of the five MSs may be reached by sending the new DCD/UCD message during frames T+3, T+4, T+7, or T+8. Accordingly, the BS may randomly select one of the four frames. However, certain embodiments may utilize an alternate method of selecting between the frames. For example, the BS may select the first frame of the two or more frames enabling the same number of MSs to be reached. In the present example, frame T+3 is the first frame of the four frames which enable three MSs to be reached.

After adding frame T+3 to the subset of frames S={T+3} and redefining the set of MSs A={4, 5}, the BS may determine that the set of MSs A is not a null set. Accordingly, the BS may repeat operations 704-710 and compile a new selection matrix, as illustrated in FIG. 9B. As a result, the BS may determine that frame T+6 would enable the remaining two MSs to receive the new DCD/UCD message. If frame T+6 was added to the subset of frames S={T+3, T+6}, and the set of MSs A was redefined, as previously described, the BS would determine that the set of MSs A became a null set and the BS could send the new DCD/UCD message during each frame of the subset of frames S.

Figure 10:
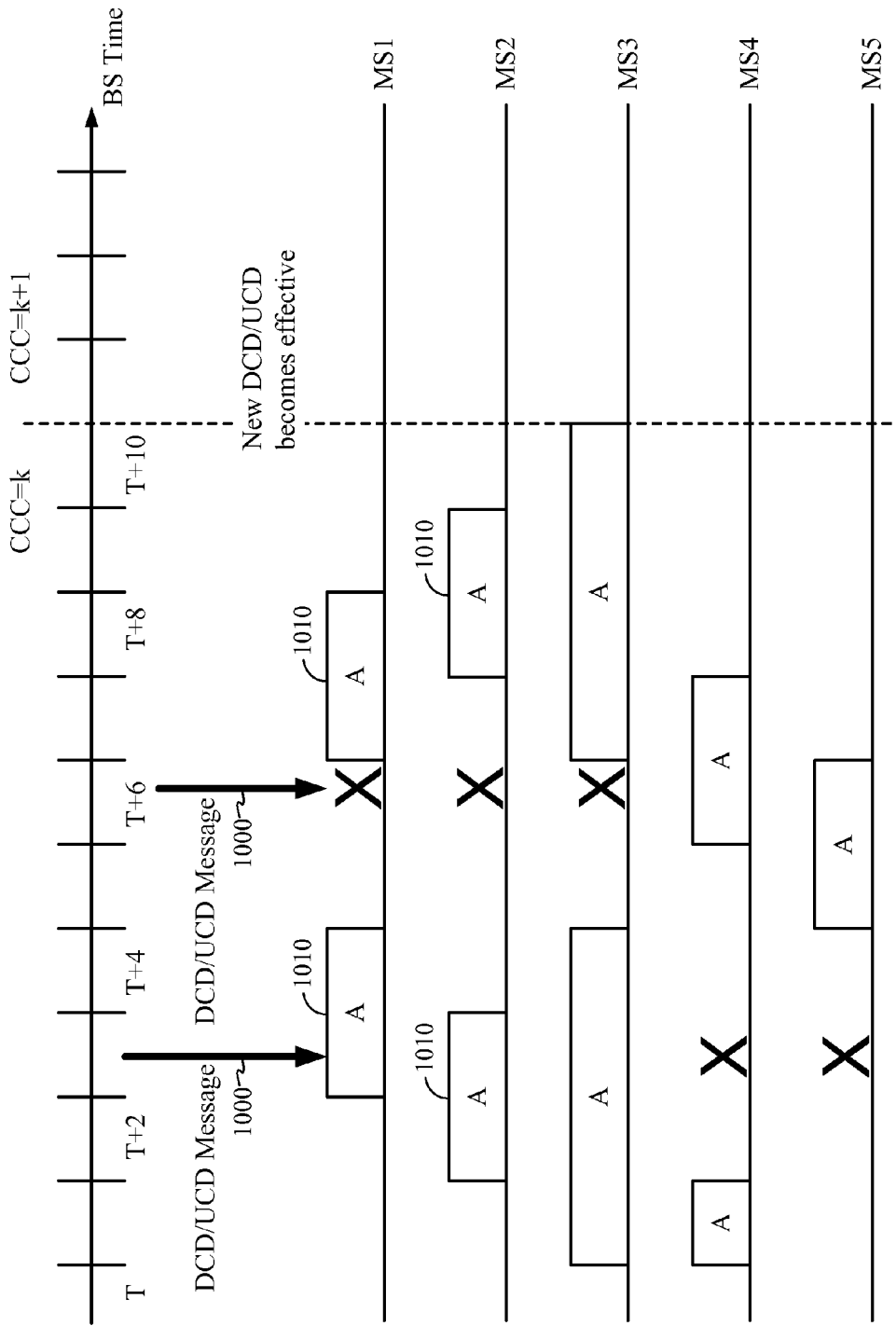
FIG. 10 illustrates two DCD messages being sent to a plurality of MSs.

FIG. 10 illustrates the BS sending the new DCD/UCD message 1000 during frames T+3 and T+6, as previously determined. If the BSs sent the new DCD/UCD message 1000 during frame T+3, the MSs with indices $i \in \{1, 2, 3\}$ would be in an available interval 1010 and would receive the new DCD/UCD message 1000; but, the MSs with indices $i \in \{4, 5\}$ would not receive the new DCD/UCD message 1000. However, when the BS sent the new DCD/UCD message 1000 a second time, during frame T+6, the MSs with indices $i \in \{4, 5\}$ would be in an available interval 1010 and would receive the new DCD/UCD message 1000. Consequently, each MS in the set of MSs A would receive the new DCD/UCD message 1000 before the new message took effect after frame 10.

Figure 6A:
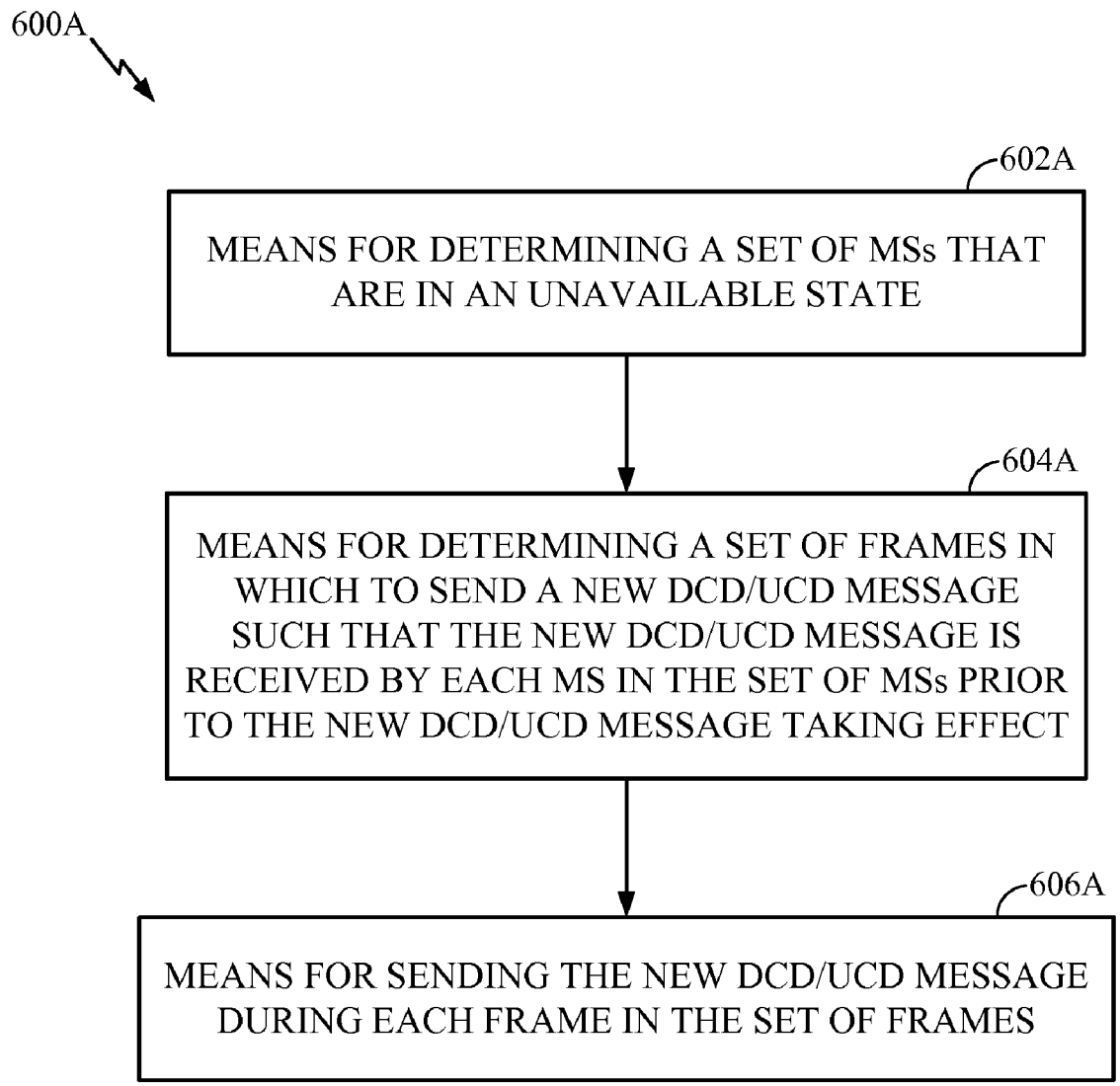
FIG. 6A is a block diagram of means corresponding to the example operations of FIG. 6.
Figure 7A:
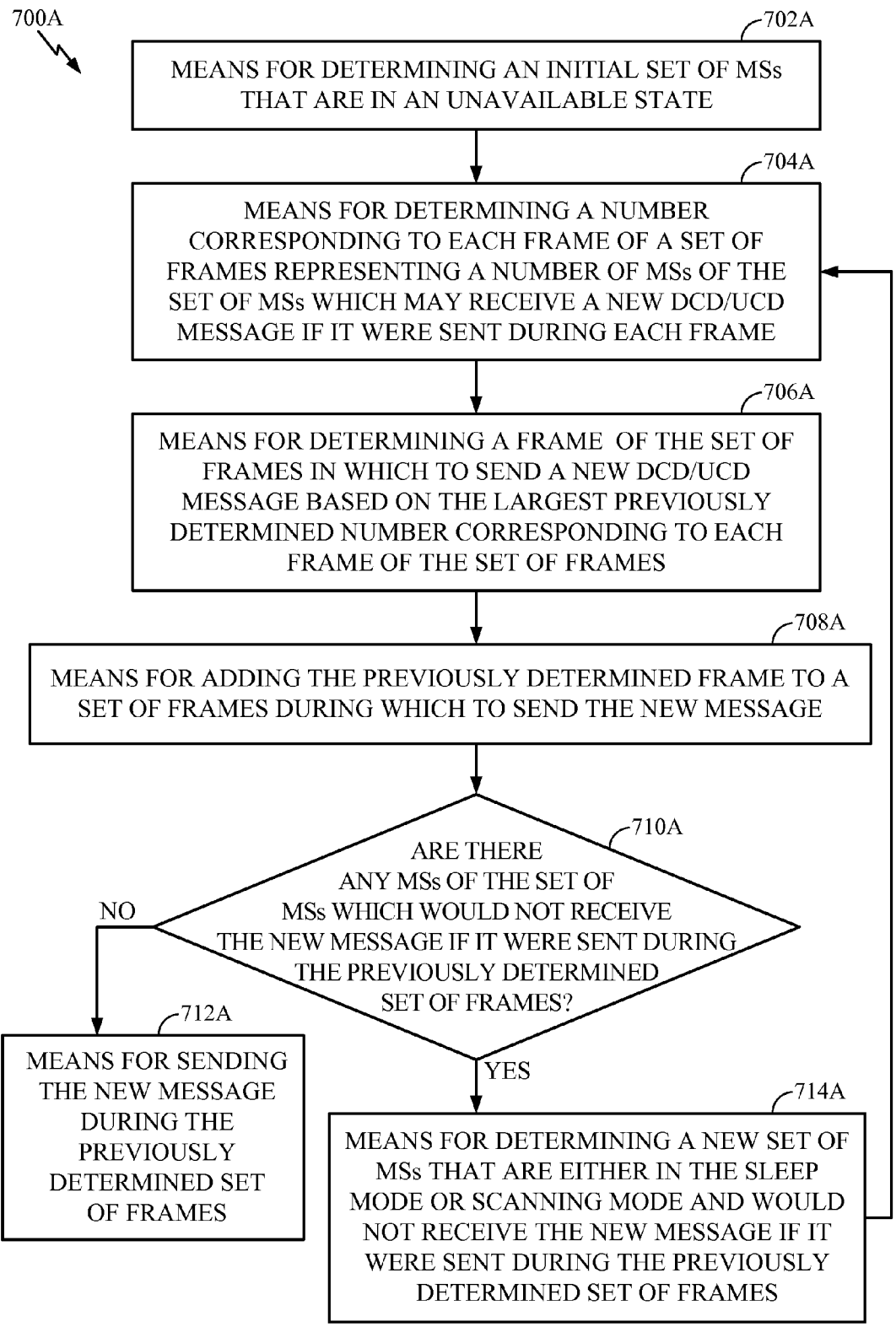
FIG. 7A is a block diagram of means corresponding to the example operations of FIG. 7.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 602-606 illustrated in FIG. 6 correspond to means-plus-function blocks 602A-606A illustrated in FIG. 6A and blocks 702-714 illustrated in FIG. 7 correspond to means-plus-function blocks 702A-714A illustrated in FIG. 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications, comprising:
   determining a first set of mobile stations (MSs) that may be in an unavailable state in a sleep mode or a scanning mode;
   determining a set of frames in which to send a new channel descriptor (CD) message, comprising at least one of a downlink channel descriptor (DCD) message and an uplink channel descriptor (UCD) message, such that the new CD message is received by each MS in the first set of MSs prior to the CD message taking effect, wherein determining a set of frames in which to send a new CD message comprises:
      determining a number corresponding to each frame of a set of frames representing a number of MSs of the first set of MSs which may receive the new CD message if it were sent during the corresponding frame;
      determining a frame of the set of frames in which to send the new CD message based at least on the number corresponding to each frame, wherein determining a frame of the set of frames in which to send the new CD message comprises selecting the frame with the largest number corresponding to each frame of the set of frames;
      adding the previously determined frame to a subset of frames during which to send the new CD message; and
      sending the new CD message during each frame of the subset of frames; and
   transmitting the new CD message during each frame in the set of frames.

2. The method of claim 1, further comprising:
   determining if there are any MSs of the first set of MSs which would not receive the new CD message if it were sent during each frame of the subset of frames; and
   performing a set of actions if there are any MSs of the first set of MSs which would not receive the new CD message if it were sent during each frame of the subset of frames.

3. The method of claim 2, wherein determining if there are any MSs of the first set of MSs which would not receive the new CD message comprises:
   determining a second set of MSs which would receive the new CD message if it were sent during each frame of the subset of frames; and
   determining a third set of MSs based on a difference between the first set of MSs and the second set of MSs, wherein the members of the third set of MSs are MSs which would not receive the new CD message if it were sent during each frame of the subset of frames.

4. The method of claim 2, wherein the set of actions comprise:
   determining again a number corresponding to each frame of a set of frames representing a number of MSs of the set of MSs which may receive the new CD message if it were sent during the corresponding frame;
   determining again a frame of the set of frames in which to send the new CD message based at least on the number corresponding to each frame; and
   adding again the previously determined frame to a subset of frames during which to send the new CD message.

5. An apparatus for wireless communications, comprising:
   a processor;
   memory in electronic communication with the processor; and
   instructions stored in the memory, the instructions being executable by the processor to:
      determine a first set of mobile stations (MSs) that may be in an unavailable state in a sleep mode or a scanning mode;
      determine a set of frames in which to send a new channel descriptor (CD) message, comprising at least one of a downlink channel descriptor (DCD) message and an uplink channel descriptor (UCD) message, such that the new CD message is received by each MS in the first set of MSs prior to the CD message taking effect, wherein the instructions are executable by the processor to:
         determine a number corresponding to each frame of a set of frames representing a number of MSs of the first set of MSs which may receive the new CD message if it were sent during the corresponding frame;
         determine a frame of the set of frames in which to send the new CD message based at least on the number corresponding to each frame, wherein the frame with the largest number corresponding to each frame of the set of frames is selected;
         add the previously determined frame to a subset of frames during which to send the new CD message; and
         send the new CD message during each frame of the subset of frames; and
      transmit the new CD message during each frame in the set of frames.

6. The apparatus of claim 5, wherein the instructions are executable by the processor to:
   determine whether there are any MSs of the first set of MSs which would not receive the new CD message if it were sent during each frame of the subset of frames; and
   determine a set of actions if there are any MSs of the first set of MSs which would not receive the new CD message if it were sent during each frame of the subset of frames.

7. The apparatus of claim 6, wherein the instructions are executable by the processor to:
   determine a second set of MSs which would receive the new CD message if it were sent during each frame of the subset of frames; and determine a third set of MSs based on a difference between the first set of MSs and the second set of MSs, wherein the members of the third set of MSs are MSs which would not receive the new CD message if it were sent during each frame of the subset of frames.

8. The apparatus of claim 6, wherein the set of actions comprise:
   determining again a number corresponding to each frame of a set of frames representing a number of MSs of the set of MSs which may receive the new CD message if it were sent during the corresponding frame;
   determining again a frame of the set of frames in which to send the new CD message based at least on the number corresponding to each frame; and
   adding again the previously determined frame to a subset of frames during which to send the new CD message.

9. An apparatus for wireless communications, comprising:
   means for determining a first set of mobile stations (MSs) that may be in an unavailable state in a sleep mode or a scanning mode;
   means for determining a set of frames in which to send a new channel descriptor (CD) message, comprising at least one of a downlink channel descriptor (DCD) message and an uplink channel descriptor (UCD) message, such that the new CD message is received by each MS in the first set of MSs prior to the CD message taking effect, wherein the means for determining a set of frames in which to send a new CD message comprises:
      means for determining a number corresponding to each frame of a set of frames representing a number of MSs of the first set of MSs which may receive the new CD message if it were sent during the corresponding frame;
      means for determining a frame of the set of frames in which to send the new CD message based at least on the number corresponding to each frame, wherein the means for determining a frame of the set of frames in which to send the new CD message comprises means for selecting the frame with the largest number corresponding to each frame of the set of frames;
      means for adding the previously determined frame to a subset of frames during which to send the new CD message; and
      means for sending the new CD message during each frame of the subset of frames; and
   means for transmitting the new CD message during each frame in the set of frames.

10. The apparatus of claim 9, further comprising:
    means for determining if there are any MSs of the first set of MSs which would not receive the new CD message if it were sent during each frame of the subset of frames; and
    means for performing a set of actions if there are any MSs of the first set of MSs which would not receive the new CD message if it were sent during each frame of the subset of frames.

11. The apparatus of claim 10, wherein the means for determining if there are any MSs of the first set of MSs which would not receive the new CD message comprises:
    means for determining a second set of MSs which would receive the new CD message if it were sent during each frame of the subset of frames; and
    means for determining a third set of MSs based on a difference between the first set of MSs and the second set of MSs, wherein the members of the third set of MSs are MSs which would not receive the new CD message if it were sent during each frame of the subset of frames.

12. The apparatus of claim 10, wherein the set of actions comprise:
    determining again a number corresponding to each frame of a set of frames representing a number of MSs of the set of MSs which may receive the new CD message if it were sent during the corresponding frame;
    determining again a frame of the set of frames in which to send the new CD message based at least on the number corresponding to each frame; and
    adding again the previously determined frame to a subset of frames during which to send the new CD message.

13. A computer-program product for wireless communications, comprising a non-transitory computer readable medium having instructions stored thereon, the instructions being executable by one or more processors and the instructions comprising:
    instructions for determining a first set of mobile stations (MSs) that may be in an unavailable state in a sleep mode or a scanning mode;
    instructions for determining a set of frames in which to send a new channel descriptor (CD) message, comprising at least one of a downlink channel descriptor (DCD) message and an uplink channel descriptor (UCD) message, such that the new CD message is received by each MS in the first set of MSs prior to the CD message taking effect, wherein the instructions for determining a set of frames in which to send a new CD message comprise:
       instructions for determining a number corresponding to each frame of a set of frames representing a number of MSs of the first set of MSs which may receive the new CD message if it were sent during the corresponding frame;
       instructions for determining a frame of the set of frames in which to send the new CD message based at least on the number corresponding to each frame, wherein the instructions for determining a frame of the set of frames in which to send the new CD message comprise instructions for selecting the frame with the largest number corresponding to each frame of the set of frames;
       instructions for adding the previously determined frame to a subset of frames during which to send the new CD message; and
       instructions for sending the new CD message during each frame of the subset of frames; and
    instructions for transmitting the new CD message during each frame in the set of frames.

14. The computer-program product of claim 13, further comprising:
    instructions for determining if there are any MSs of the first set of MSs which would not receive the new CD message if it were sent during each frame of the subset of frames; and
    instructions for performing a set of actions if there are any MSs of the first set of MSs which would not receive the new CD message if it were sent during each frame of the subset of frames.

15. The computer-program product of claim 14, wherein the instructions for determining if there are any MSs of the first set of MSs which would not receive the new CD message comprise:
    instructions for determining a second set of MSs which would receive the new CD message if it were sent during each frame of the subset of frames; and
    instructions for determining a third set of MSs based on a difference between the first set of MSs and the second set of MSs, wherein the members of the third set of MSs are MSs which would not receive the new CD message if it were sent during each frame of the subset of frames.

16. The computer-program product of claim 14, wherein the set of actions comprise:
  determining again a number corresponding to each frame of a set of frames representing a number of MSs of the set of MSs which may receive the new CD message if it were sent during the corresponding frame;
  determining again a frame of the set of frames in which to send the new CD message based at least on the number corresponding to each frame; and
  adding again the previously determined frame to a subset of frames during which to send the new CD message.

* * * * *